(12) United States Patent
Kellerman et al.

(10) Patent No.: US 11,283,250 B2
(45) Date of Patent: Mar. 22, 2022

(54) SLIDER BRACKET ASSEMBLY

(71) Applicant: Cablofil, Inc., Mascoutah, IL (US)

(72) Inventors: Dallas Kellerman, Belleville, IL (US); Brian Caveny, Bethalto, IL (US)

(73) Assignee: CABLOFIL, INC., Mascoutah, IL (US)

( * ) Notice: Subject to any disclaimer, the term of this patent is extended or adjusted under 35 U.S.C. 154(b) by 0 days.

(21) Appl. No.: 16/937,978

(22) Filed: Jul. 24, 2020

(65) Prior Publication Data

US 2022/0029397 A1    Jan. 27, 2022

(51) Int. Cl.
*H02G 3/04* (2006.01)
*F16L 3/26* (2006.01)
*F16M 13/02* (2006.01)

(52) U.S. Cl.
CPC .............. *H02G 3/0456* (2013.01); *F16L 3/26* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,042,351 A * | 7/1962 | Du Bois | ............. | H02G 3/0437 248/49 |
| 3,053,494 A * | 9/1962 | Stoll | ......... | F16L 3/24 248/228.3 |
| 5,384,937 A * | 1/1995 | Simon | ................. | H02G 3/0443 211/181.1 |
| 5,687,941 A * | 11/1997 | Quintile | .................... | E06C 7/14 248/210 |
| 5,899,041 A * | 5/1999 | Durin | ..................... | E04B 9/065 52/660 |
| 6,019,322 A | 2/2000 | Shimizu | | |
| 6,023,024 A * | 2/2000 | Stjerneby | ............. | H02G 3/0443 174/95 |
| 6,061,884 A * | 5/2000 | Ohms | ................. | H02G 3/0443 24/545 |
| 6,138,961 A * | 10/2000 | Zweig | ................. | H02G 3/0443 248/68.1 |
| 6,193,434 B1 * | 2/2001 | Durin | .................. | H02G 3/0443 403/329 |
| 6,247,871 B1 * | 6/2001 | Nickel | ................. | H02G 3/0443 211/126.3 |
| 6,402,418 B1 * | 6/2002 | Durin | .................. | H02G 3/0443 403/329 |
| 6,489,566 B1 * | 12/2002 | Durin | .................. | H02G 3/0443 174/135 |
| 6,637,704 B2 | 10/2003 | Jette | | |
| 6,745,555 B2 | 6/2004 | Hermey et al. | | |

(Continued)

*Primary Examiner* — Monica E Millner
(74) *Attorney, Agent, or Firm* — Bryan Cave Leighton Paisner LLP

(57) ABSTRACT

A slider bracket assembly is provided having one or more slider brackets, one or more strap-slider brackets, a main cable tray, and a tray section, wherein the one or more slider brackets couple the one or more strap-slider brackets to both the main cable tray and the tray section. Methods for installing a slider bracket assembly comprise coupling slider brackets to a first strap-slider bracket and a second strap-slider bracket, coupling the first and second strap-slider brackets to a tray section to form a tray section assembly, and then coupling the tray assembly to a main cable tray using the first and second strap-slider brackets.

3 Claims, 19 Drawing Sheets

(56) References Cited

U.S. PATENT DOCUMENTS

| | | | | |
|---|---|---|---|---|
| 6,855,884 B2* | 2/2005 | Spagnoli | ............... | H02G 3/0443 |
| | | | | 174/100 |
| 7,249,452 B2 | 7/2007 | Komiya | | |
| 7,373,759 B1* | 5/2008 | Simmons | .............. | E04F 15/024 |
| | | | | 248/188.1 |
| 7,428,808 B2 | 9/2008 | Utaki et al. | | |
| 7,468,491 B2* | 12/2008 | Deciry | ................. | H02G 3/0443 |
| | | | | 174/135 |
| 7,546,987 B2* | 6/2009 | Sinkoff | ................ | H02G 3/0443 |
| | | | | 248/68.1 |
| 7,586,036 B2 | 9/2009 | Davis et al. | | |
| 7,608,786 B2* | 10/2009 | Deciry | ................ | H02G 3/0608 |
| | | | | 174/135 |
| 7,708,491 B2* | 5/2010 | Quertelet | ............. | H02G 3/0608 |
| | | | | 403/346 |
| 7,770,344 B2* | 8/2010 | Betz | ..................... | H02G 3/0443 |
| | | | | 52/263 |
| 7,789,359 B2* | 9/2010 | Chopp, Jr. | ........... | H02G 3/0456 |
| | | | | 248/211 |
| 7,841,566 B2 | 11/2010 | Kellerman | | |
| 7,903,924 B2* | 3/2011 | Pollard, Jr. | .......... | H02G 3/0443 |
| | | | | 385/135 |
| 7,954,776 B2* | 6/2011 | Davis | ................... | H02G 3/0608 |
| | | | | 248/231.81 |
| 8,097,808 B2* | 1/2012 | Quertelet | ............. | H02G 3/0443 |
| | | | | 174/97 |
| 8,157,235 B2* | 4/2012 | Quertelet | ............. | H02G 3/0443 |
| | | | | 248/339 |
| 8,173,903 B2* | 5/2012 | Letourneur | .......... | H02G 3/0443 |
| | | | | 174/135 |
| 8,559,783 B2* | 10/2013 | Campos | ............... | G02B 6/4439 |
| | | | | 385/135 |
| 8,757,559 B2* | 6/2014 | Davis | ................... | F16B 7/0493 |
| | | | | 248/49 |
| 9,293,899 B2* | 3/2016 | Rouleau | ............... | H02G 3/0608 |
| 9,447,914 B2* | 9/2016 | Neace | ...................... | H02G 3/32 |
| 9,568,697 B2* | 2/2017 | Gallegos, III | ........ | G02B 6/4452 |
| 9,587,433 B2* | 3/2017 | Sylvester | .............. | F16L 3/1211 |
| 10,008,841 B2* | 6/2018 | Rouleau | ............... | H02G 3/0608 |
| 10,084,294 B2* | 9/2018 | Bethoule | ................ | H02G 1/04 |
| 10,266,122 B2* | 4/2019 | Rouleau | .................. | H02G 3/32 |
| 2002/0030143 A1 | 3/2002 | Jette | | |
| 2005/0173596 A1 | 8/2005 | Herzog | | |
| 2006/0038091 A1 | 2/2006 | Winn et al. | | |

* cited by examiner

SLIDER BRACKET ASSEMBLY

BACKGROUND

The present disclosure relates to cable tray systems for use with electrical and other cable and wiring systems.

Cable trays are used to support cables, electrical wires and the like which run through, over, and around buildings. Cable trays may have both straight and curved (horizontal and/or vertical) sections to accommodate the installation requirements of particular settings. Often, cable trays must be cut and reassembled to accommodate the installation requirements. There is a need for an easily installable bracket assembly and tray system to readily accommodate a variety of settings.

SUMMARY OF THE DISCLOSURE

One aspect of the disclosure is directed to a slider bracket assembly comprising one or more slider brackets, one or more strap-slider brackets, a main cable tray, and a tray section, wherein the one or more slider brackets adjustable couple the one or more strap-slider brackets to both the main cable tray and the tray section.

In some embodiments, the strap-slider brackets have one of a 90 degree bend or a radius bend. In some embodiments, the strap-slider bracket is a wire-style bracket.

In some embodiments, the slider bracket has a flange for coupling the strap-slider brackets to a portion of one of the main cable tray and tray section. In some embodiments, the slider brackets further have two ears for coupling each slider bracket to the strap-slider brackets and a fastener to affix the one or more slider brackets to the one or more strap-slider brackets. In other embodiments, the slider brackets are a corner clip assembly.

Another aspect of the disclosure is directed to a method for installing a slider bracket assembly, comprising coupling a first slider bracket to a first portion of a first strap-slider bracket, coupling a second slider bracket to a second portion of a first strap-slider bracket to form a first bracket assembly, coupling a third slider bracket to a first portion of a second strap-slider bracket, coupling a fourth slider bracket to a second portion of the second strap-slider bracket to form a second bracket assembly, rotating the first bracket assembly to couple a flange on the first slider bracket to a first portion of a tray section, rotating the first bracket assembly so that the first slider bracket is flush with an end portion of the first portion of the tray section, while the flange remains coupled to the first portion of the tray section, rotating the second bracket assembly to couple a flange on the second slider bracket to a second portion of the tray section, rotating the second bracket assembly so that the second slider bracket is flush with an end portion of the second portion of the tray section, while the flange remains coupled to the second portion of the tray section to form a tray section assembly.

In some embodiments, the method further includes the steps of aligning the tray section assembly with an opening in a main cable tray, rotating the tray section assembly to couple a flange on the second slider bracket to a first portion of a main cable tray and a flange on the fourth slider bracket to a second portion of a main cable tray, rotating the tray section assembly so that the second slider bracket is flush with a first side portion of the of the main cable tray, and the fourth slider bracket is flush with a second side portion of the main cable tray, while the flange on the second slider bracket and the flange on the fourth slider bracket both remain coupled to the main cable tray, such that a floor of the tray section assembly becomes substantially coplanar with a floor of the main cable tray.

In some embodiments, the method further includes coupling the floor of the tray section assembly to the floor of the main cable tray with a washer.

Another aspect of the disclosure is a slider bracket assembly comprising a first and a second wire-style bracket, each bracket having two loops, wherein a first loop of the first the wire-style bracket couples to a first portion of a tray section and a second loop of the first wire-style bracket couples to a first portion of a main cable tray; and wherein a first loop of the second wire-style bracket couples to a second portion of the tray section and a second loop of the second wire-style bracket couples to a second portion of the main cable tray.

BRIEF DESCRIPTION OF THE FIGURES

These and other features, aspects and advantages of the disclosure will become more fully apparent from the following detailed description, appended claims, and accompanying drawings, wherein the drawings illustrate features in accordance with exemplary aspects of the disclosure, and wherein:

DETAILED DESCRIPTION

The accompanying figures and this description depict and describe aspects of a cable conveyance system in accordance with the present disclosure, and features and components thereof. It should also be noted that any references herein to front and back, right and left, top and bottom, upper and lower, and first and/or second are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Various aspects of the present disclosure are directed to a cable conveyance system for routing cables. With reference to FIGS. 1-13, an aspect of a slider bracket assembly 100 is described in detail.

Figure 1:
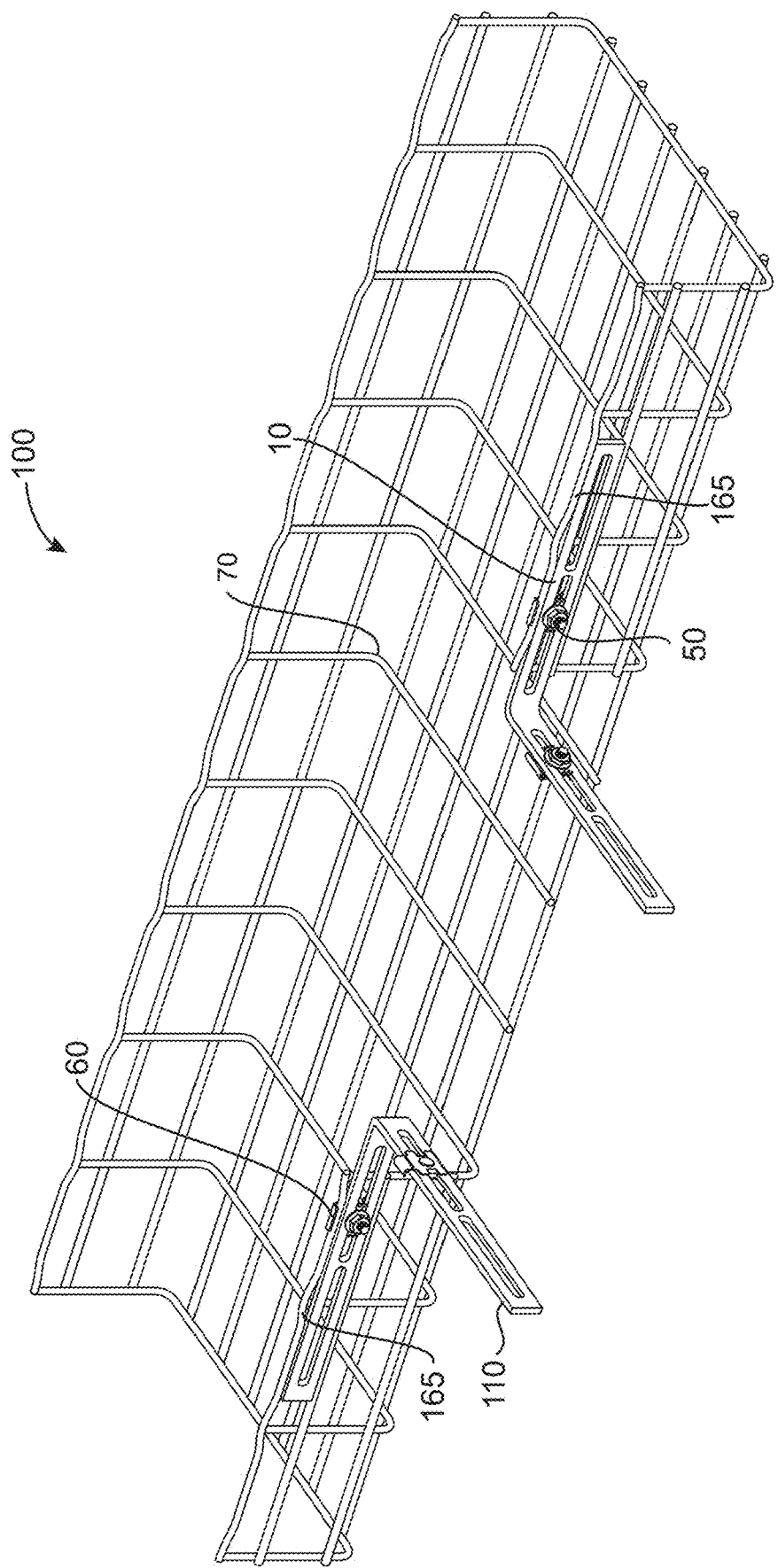
FIG. 1 is an isometric view of a slider bracket assembly according to one aspect of the disclosure.

With reference to FIG. 1, slider bracket assembly 100 is used to couple together a cable tray system. The slider bracket assembly 100 comprises a slider bracket system 110 that is used to couple together a main cable tray 70 and a wire tray section 150. The slider bracket system 110 comprises one or more slider brackets 50 that are used to adjustably couple a strap-slider bracket 10 to wire mesh sections 65, 165 of tray section 150 and cable tray 70, respectively.

Figure 2:
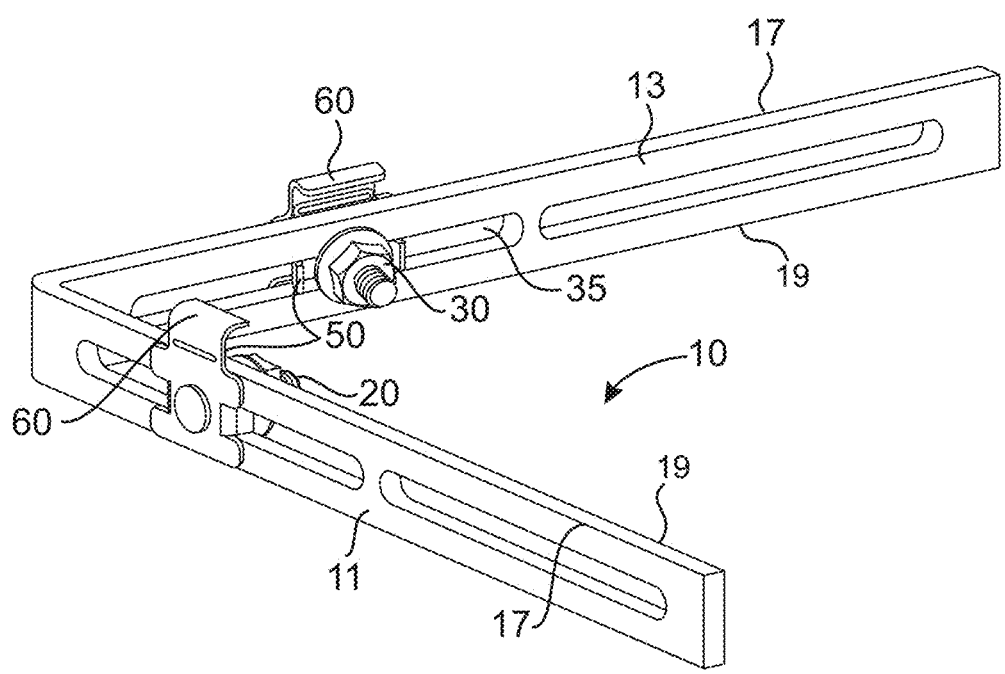
FIG. 2 is an isometric view of a strap slider bracket according to one aspect of the disclosure.

With reference to FIG. 2, in some embodiments, the strap-slider bracket 10 may be configured with a 90 degree bend, such that it has a first portion 11 and a second portion 13, the first and section portions bent approximately 90 degrees relative to one another. Both the first portion 11 and second portion 13 have an inner side and an outer side 19, 17. In other embodiments, strap-slider bracket 10 may have two or more 90 degree bends, or one or more 45 degree bends, or any combination of bends or curves of varying degrees of radius. Strap-slider bracket 10 comprises one or more openings 35 to which one or more slider brackets 50 may be coupled.

Figure 3:
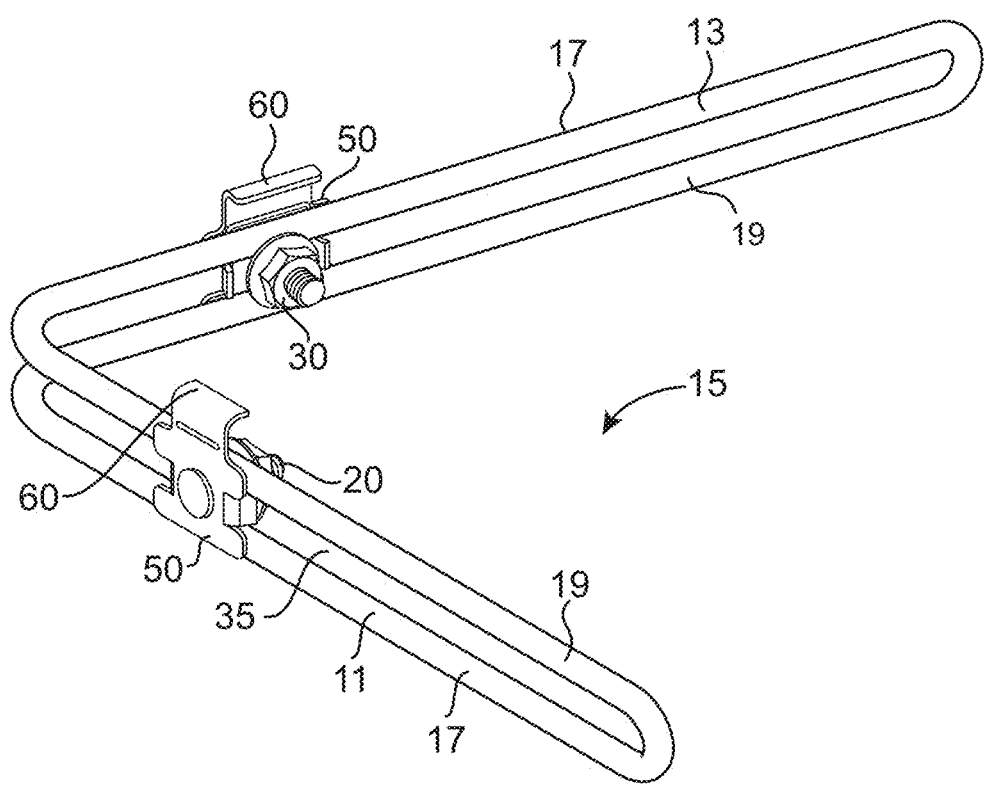
FIG. 3 is an isometric view of a wire-style slider bracket according to one aspect of the disclosure.

In some embodiments, and with reference to FIG. 3, strap-slider bracket 10 can be a wire-style bracket 15. Like the strap-slider bracket 10, wire-style bracket 15 may be configured with a 90 degree bend, such that it has a first portion 11 and a second portion 13. Both the first portion 11 and second portion 13 have an inner side and an outer side 19, 17. In other embodiments, wire-style bracket 15 may have two or more 90 degree bends, or one or more 45 degree bends, or any combination of bends or curves of varying radius of curvature. Wire-style bracket 15 comprises one or more openings 35 to which one or more slider brackets 50 may be coupled.

In some embodiments, strap-slider bracket 10 and/or wire-style bracket 15 can be used to provide further strength and rigidity to a cable tray system. In some embodiments, strap-slider bracket 10 and/or wire-style bracket 15 is constructed of steel or an alloy thereof; however, it will be understood that any type of suitable material may be used, including, but not limited to, plastics, aluminum, stainless steel, or alloys thereof.

Figure 4:
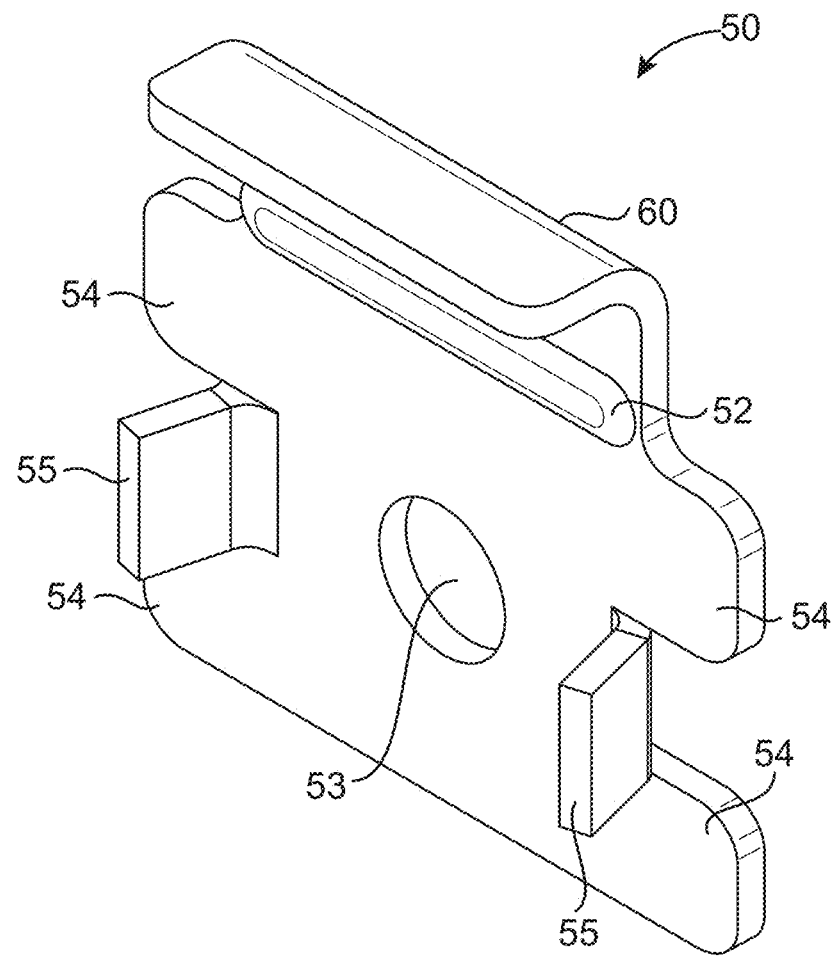
FIG. 4 is a side perspective view of a slider bracket according to one aspect of the disclosure.
Figure 5:
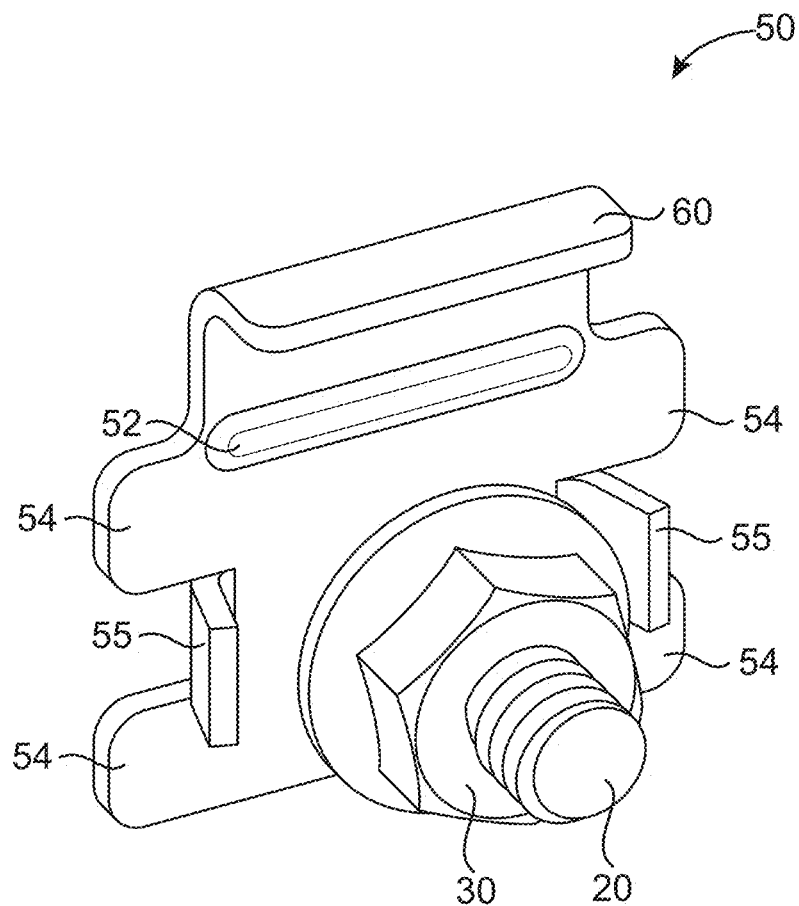
FIG. 5 is a second side perspective view of a slider bracket according to one aspect of the disclosure.
Figure 6:
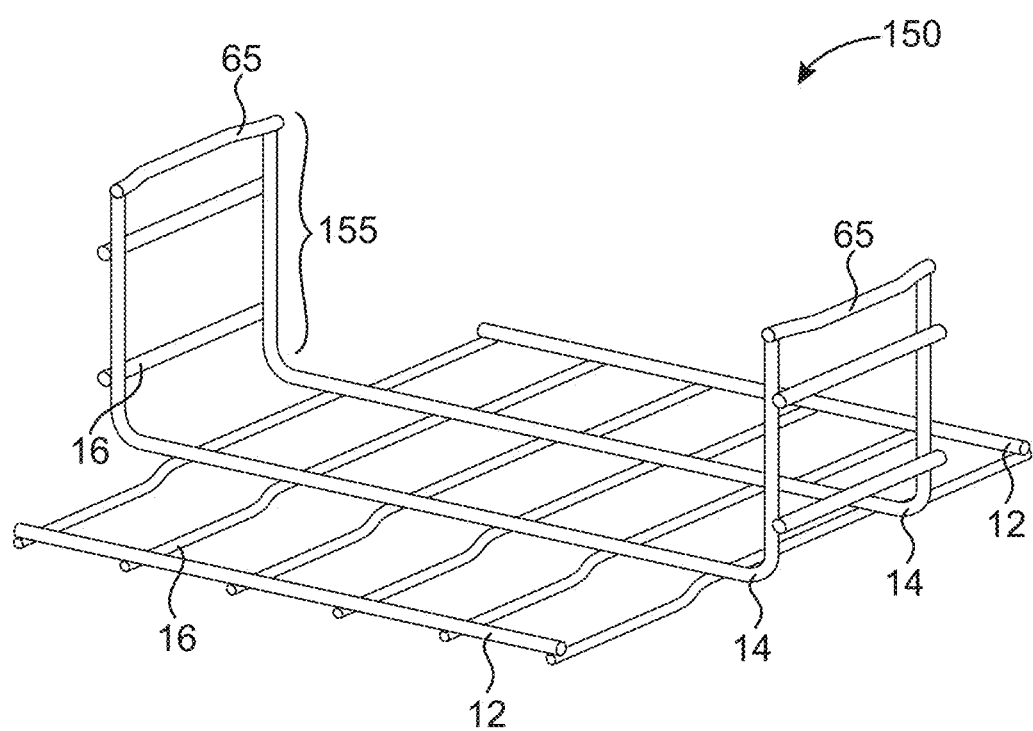
FIG. 6 is an isometric view of a dual drop town tech-tray according to one aspect of the disclosure.

With reference to FIGS. 4 and 5, slider bracket 50 comprises a flange 60 for coupling strap-slider bracket 10 and/or wire-style bracket 15 to a portion wire mesh sections 65, 165. Slider bracket 50 further comprises one or more end portions 54 and two ears 55. The ears 55 can facilitate coupling slider bracket 50 to the opening 35 of strap-slider bracket 10 and/or wire-style bracket 15. In some embodiments, slider bracket 50 additionally comprises an elongate horizontal rib 52 that is configured to abut against the strap-slider bracket 10 and/or wire-style bracket 15 during coupling. Slider bracket includes one or more holes 53 for receiving a fastener 20, such as, for example, a bolt or screw or other type of fastener and/or one or more nuts 30. In some embodiments, during coupling of the strap-slider bracket 10 and/or wire-style bracket 15 to a portion of main cable tray 70 and/or tray section 150, bolt 20 and nut 30 can be used to fasten slider bracket to strap-slider bracket 10 and/or wire-style bracket 15 to a portion wire mesh sections 65, 165.

Methods for coupling the slider bracket 50 to strap-slider bracket 10 and/or wire-style bracket 15 and also to a portion of main cable tray 70 and/or wire mesh section 65, and/or tray section 150 and/or wire mesh sections 165 can be further understood with reference to FIGS. 1, 6 and 7A-H. In some embodiments, a tray section 150 can be coupled to a main cable tray 70 using one or more strap-slider brackets 10 and/or wire-style brackets 15.

The tray section 150 comprises two outer side rails 12 and one or more inner rails 14, where the distance between the two outer side rails 12 is a width W. In some embodiments, the side rails and inner rails 14 are spaced apart by a population of transverse rungs 16 extending between the inner rails 14 and between each inner rail 14 and each outer side rail 12. In other embodiments, the rails 12, 14 are spaced apart by one or more plates (not shown).

The population of transverse rungs 16 are spaced at intervals along the length of the rails 14, 12, forming a ladder-like structure. In some embodiments, the rungs are spaced 2 inches from one another, while in other embodiments, the rungs may be spaced closer to one another (i.e., less than 2 inches), or further apart from one another (i.e., greater than 2 inches). In some embodiments, the rungs 16 are 4 inches wide, thus spacing the rails 12, 14 approximately 4 inches from one another, however, the rungs can be wider or less wide, depending upon the desired dimensions of each tray section 150. In some embodiments, wires or cables will lay length-wise in the trays system 10, such that they lay upon the side rails 12, 14.

In some embodiments, the tray section 150 comprises one or more bent side sections 155 of inner rails 14, containing one or more rungs 16 and one or more top wire mesh sections 65. In some embodiments, the bent side section 155 is bent at approximately a 90 degree angle upward from the planar portion of the inner rails 14. In other embodiments, the bent section 155 is bent at less or greater than a 90 degree angle.

Figure 7A:
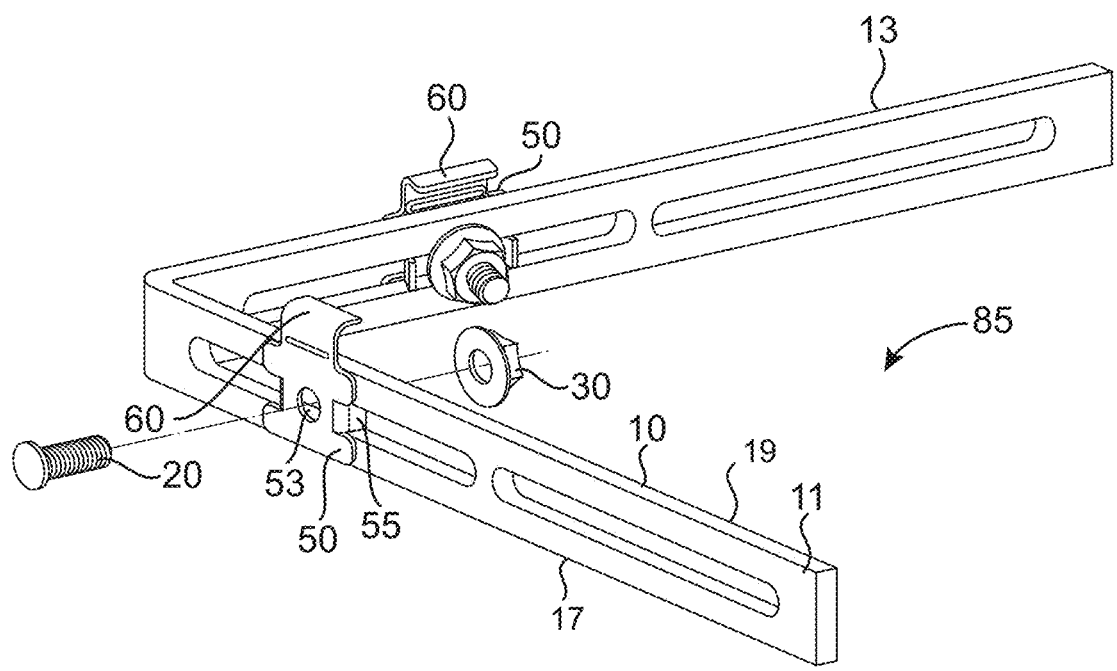
FIG. 7A is an isometric view of a first step in assembling a slider bracket assembly according to one aspect of the disclosure.
Figure 7B:
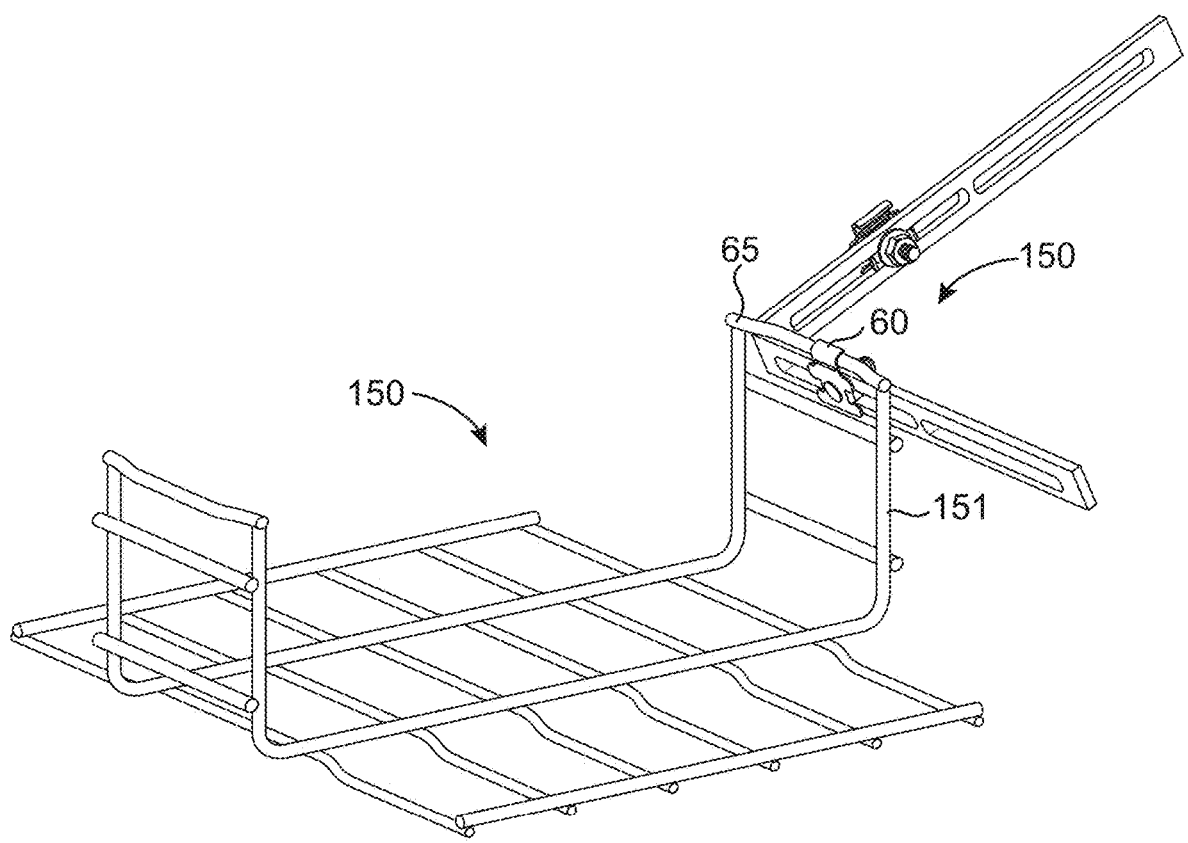
FIG. 7B is an isometric view of a second step in assembling a slider bracket assembly according to one aspect of the disclosure.
Figure 7C:
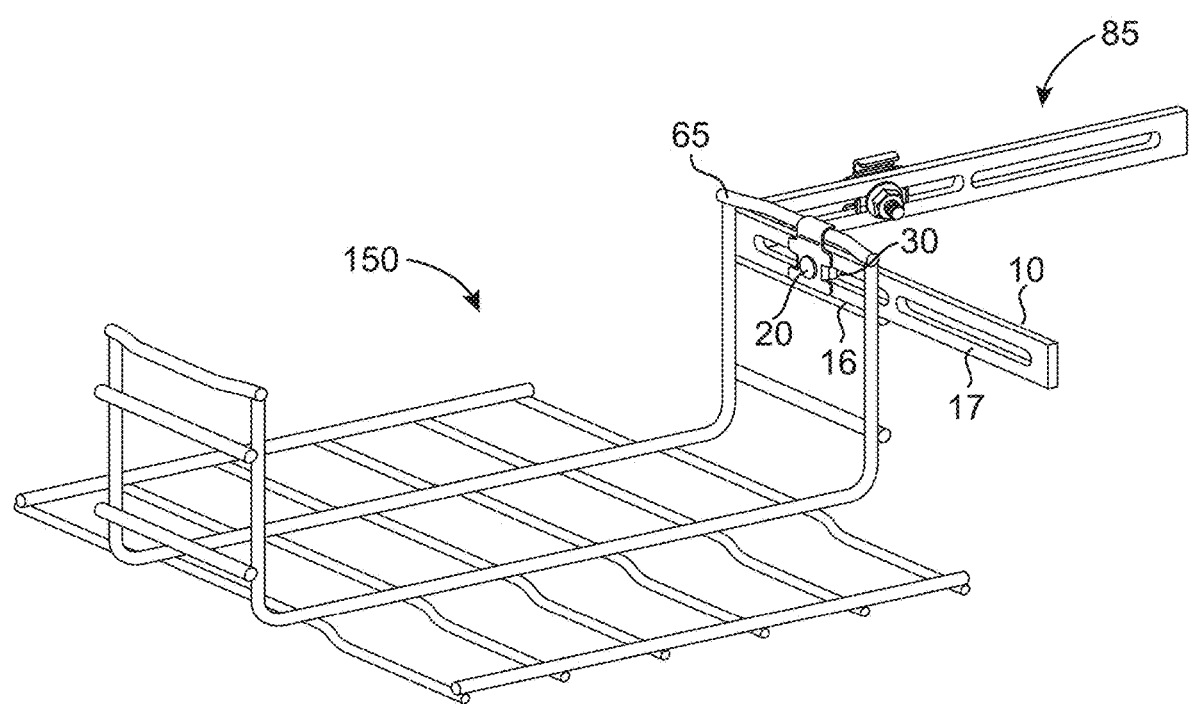
FIG. 7C is an isometric view of a third step in assembling a slider bracket assembly according to one aspect of the disclosure.
Figure 7D:
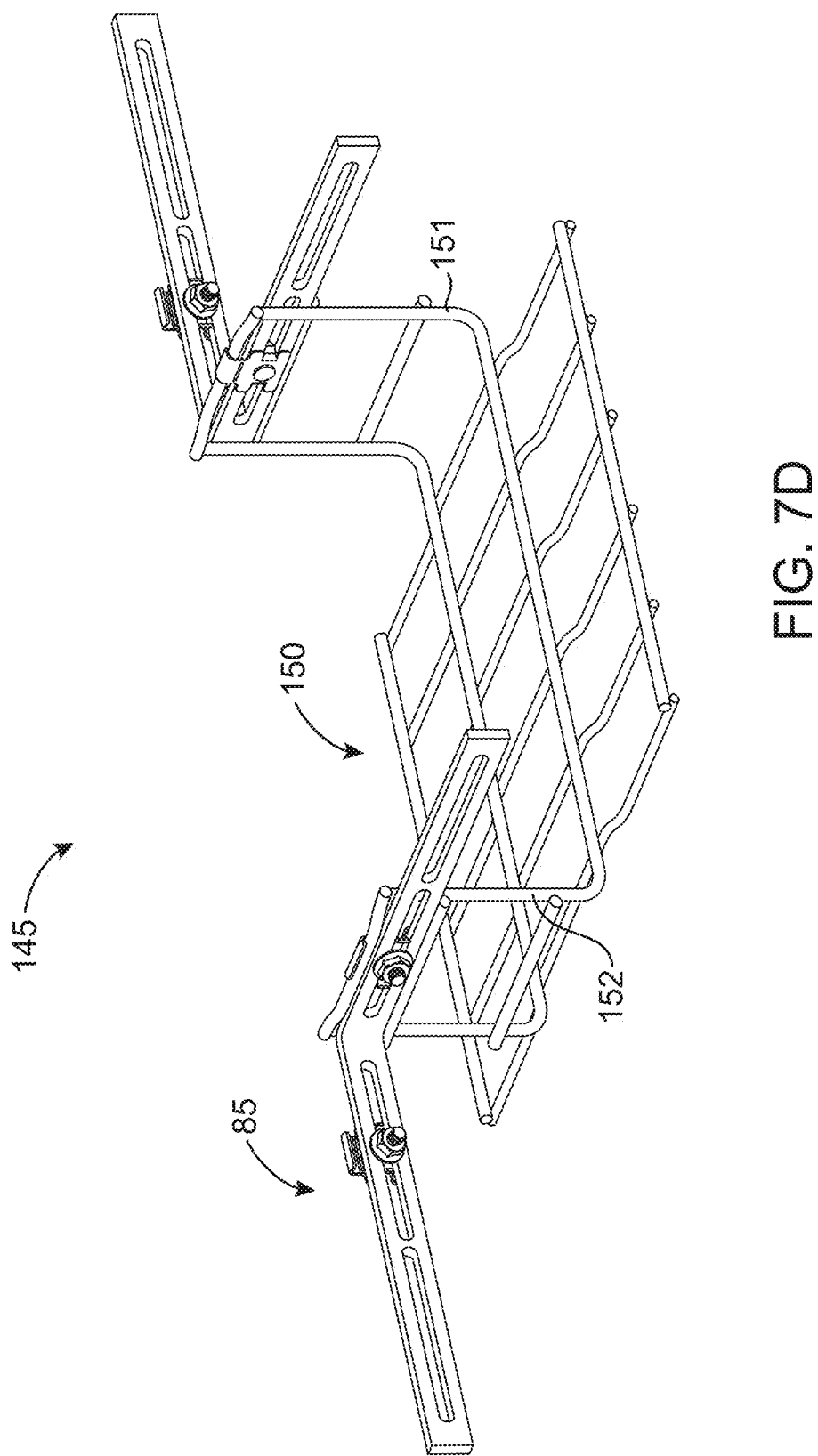
FIG. 7D is an isometric view of a fourth step in assembling a slider bracket assembly according to one aspect of the disclosure.
Figure 7E:
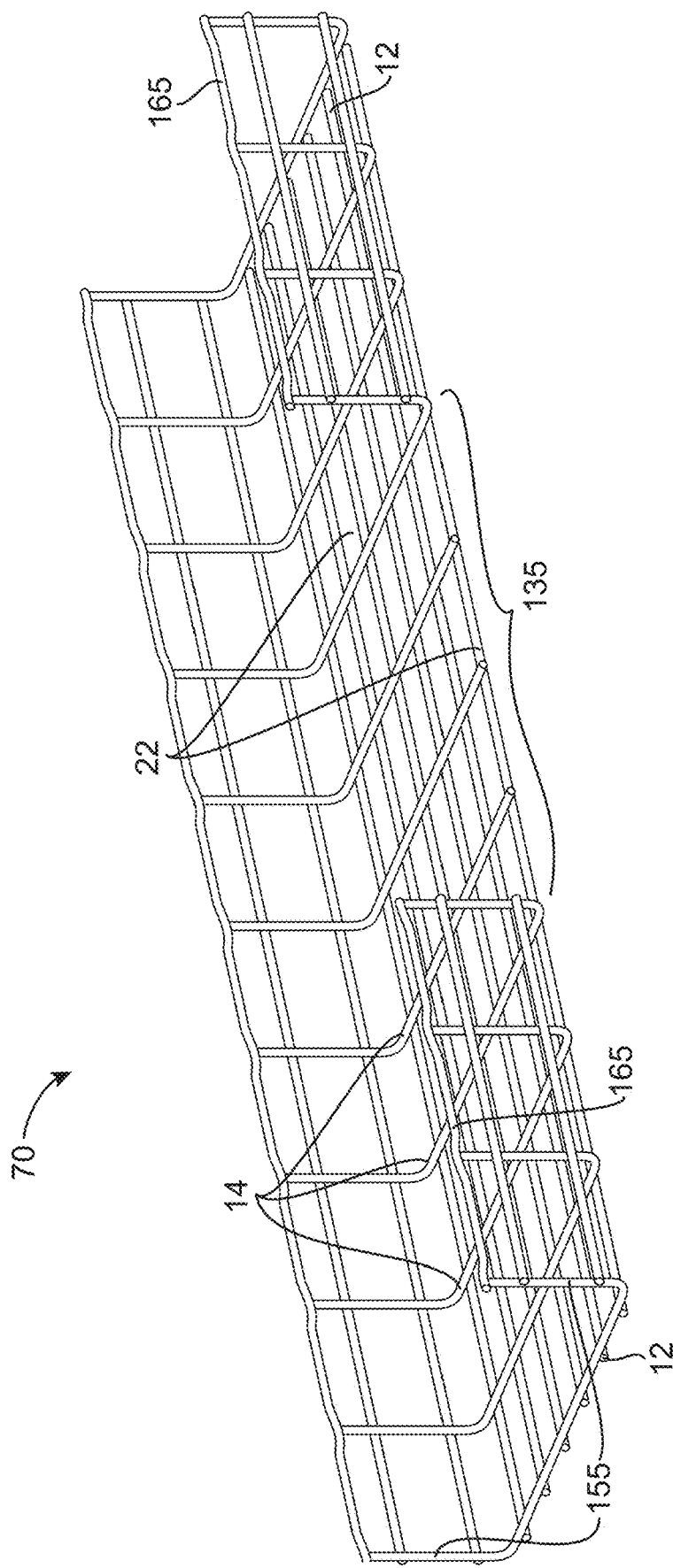
FIG. 7E is an isometric view of a fifth step in assembling a slider bracket assembly according to one aspect of the disclosure.

In some embodiments and with reference to FIG. 7E, the main cable tray 70 comprises multiple inner rails 14 and two outer rails 12, where the rails 12, 14 are spaced apart by a plurality of rungs 16, where rungs 16 and rails 12 and 14 form a floor 22. In some embodiments, main cable tray 70 comprises one or more bent sections 155 on each side of the tray 70 where each bent section 155, contains one or more rungs 16 and a top wire mesh section 165. In some embodiments, main cable tray 70 comprises an opening 135 on one or more sides of the tray 70, such that instead of tray 70 comprising bent sections 155 throughout an entire side, a portion of bent sections 155 are missing to form an opening 135 between adjacent bent sections 155. In some embodiments, the opening 135 has a width W that is slightly wider than the width W of tray section 150. In some embodiments, the opening 135 is cut during installation and/or assembly of the slider bracket tray assembly 100. In other embodiments, tray 70 is pre-cut prior to installation and/or assembly.

With reference to FIG. 7A, one or more slider brackets 50 is first secured loosely to strap-slider bracket 10. While the example references the use of strap-slider bracket 10, wire-style bracket 15 can also be used. As part of securing the slider bracket 50 to strap-slider bracket 10, one or more slider brackets 50 is coupled to the outer portion 17 of strap-slider bracket 10 by lining the ears 55 up within one of the openings 35 of strap-slider bracket 10, such that the flange 60 points upwards from the strap-slider bracket 10. Each slider bracket 50 can then be secured to strap-slider bracket 10 using a bolt 20 and a nut 30 to form a bracket assembly 85, where the bolt and nut are fastened to the inner portion of the strap-slider bracket 10.

Next, with reference to FIG. 7B, the bracket assembly 85 can be coupled to a first end 151 of the tray portion 150 by rotating the bracket assembly 85 upwards from the first end 151 in approximately a 45 degree angle such that the flange 60 of one of the brackets 50 mates with one of the top wires 65 on the first end 151 of the tray portion 150.

With reference to FIG. 7C, the bracket assembly 85 is then rotated downwards such that the outer side portion 17 of the strap-slider bracket 10 is flush with the rails 14 adjacent to the top mesh wire 65 and a rung 16 of tray portion 150. At this point, the nut 30 and bolt 20 can be tightened.

With reference to FIG. 7D, a second strap-slider bracket assembly 85 can be coupled to a second end 152 of tray portion 150 in a manner similar to those described with reference to FIGS. 7B and 7C to form a tray portion assembly 145.

Next, with reference to FIG. 7E, in some embodiments, a main tray 70 can be cut such that the width W of opening 135 is slightly wider than the width W of the tray portion 150. In other embodiments, main tray 70 is pre-cut such the width W of opening 135 is slightly wider than the width W of the tray portion 150.

Figure 7F:
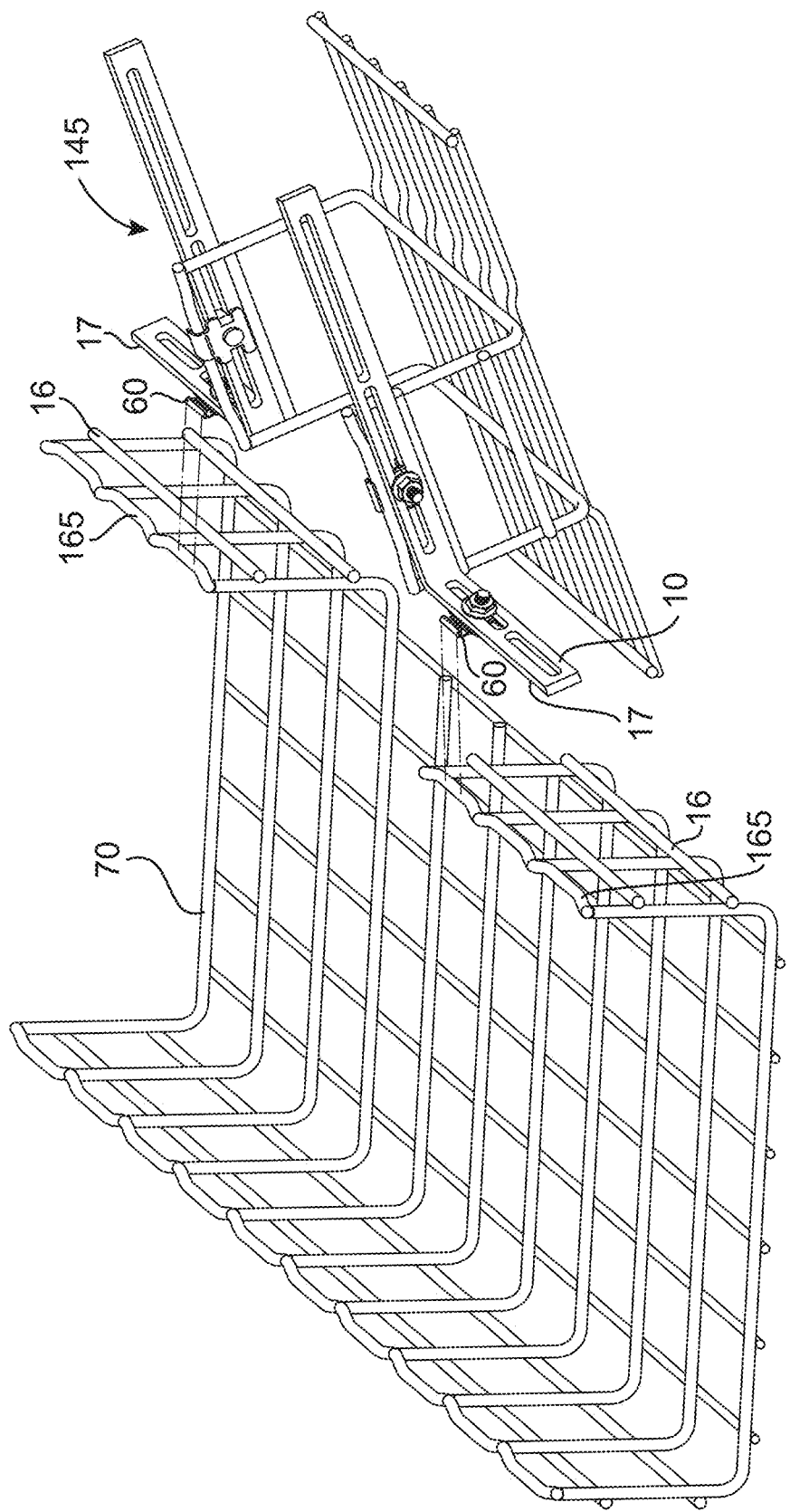
FIG. 7F is an isometric view of a sixth step in assembling a slider bracket assembly according to one aspect of the disclosure.
Figure 7G:
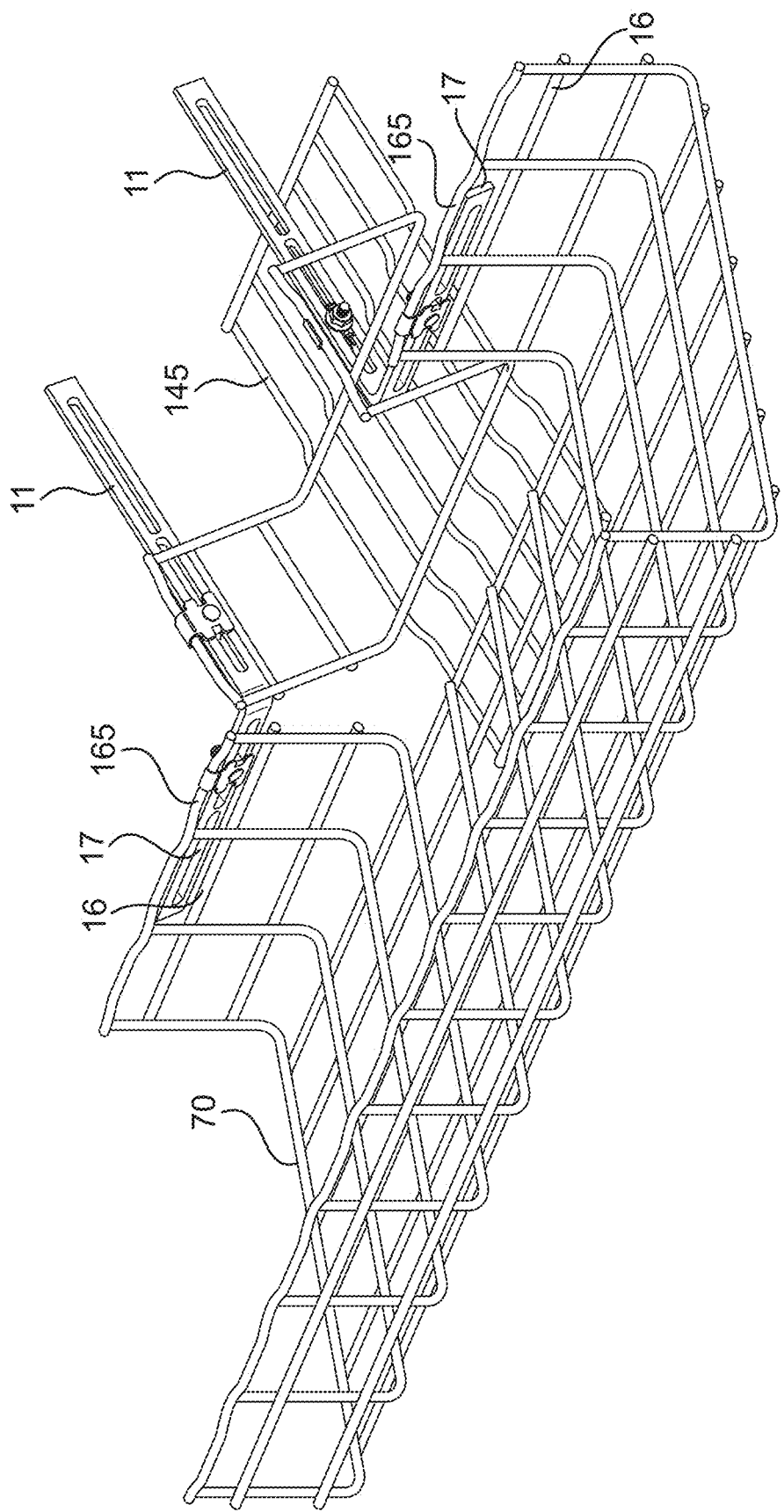
FIG. 7G is a top level perspective of a seventh step in assembling a slider bracket assembly according to one aspect of the disclosure.

With reference to FIGS. 7F and 7G, tray portion assembly 145 is rotated upwards approximately 45 degrees such that the flanges 60 on the back sides 17 of the strap-slider brackets 10 couple to the top wire mesh sections 165 of cable tray 70.

Figure 7H:
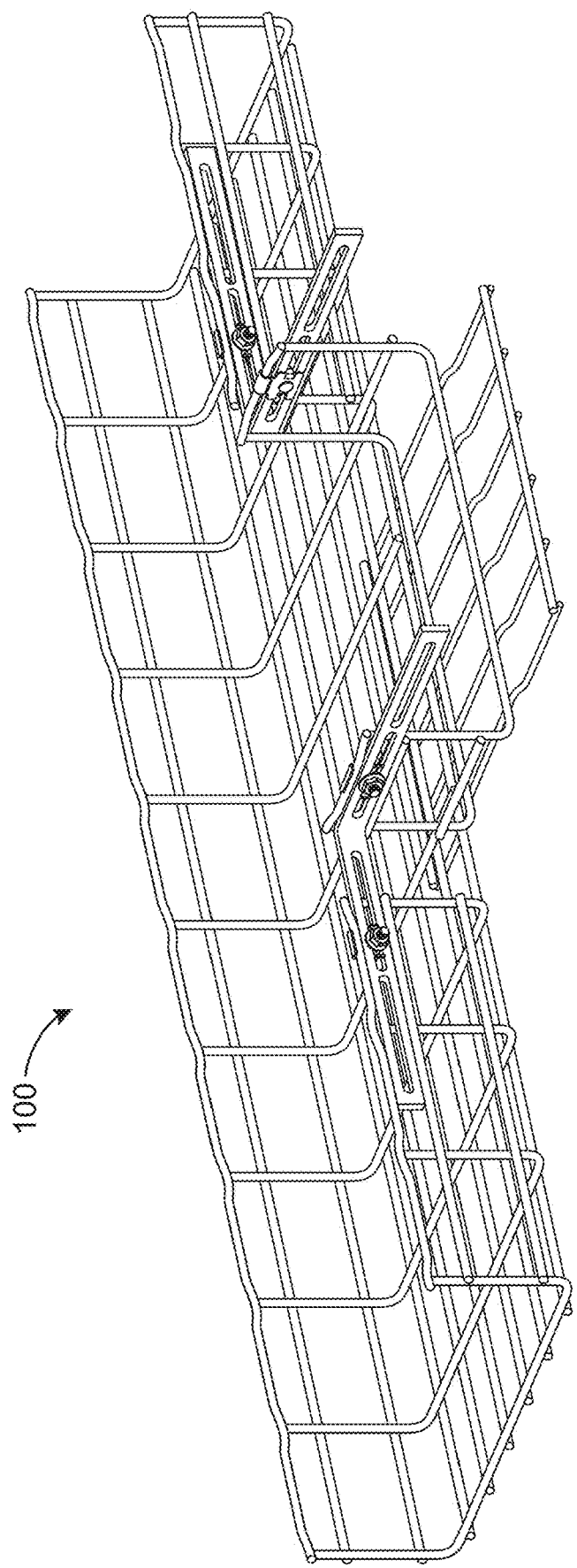
FIG. 7H is an isometric view of an eighth step in assembling a slider bracket assembly according to one aspect of the disclosure.

After the flanges 60 have coupled to wire mesh sections 165, and with reference to FIG. 7H, the tray portion assembly 145 is rotated downward such that the back sides 17 of strap-slider brackets 10 are flush against the rails 14 adjacent to wire mesh sections 165 and adjacent top rungs 16 of the cable tray 70 to form the slider bracket tray assembly 100.

In some embodiments, a portion 11 of the strap-slider bracket 10 may extend outward from the tray portion assembly 145, such that the portion 11 can be used to secure additional slider brackets 50 and additional tray portions and/or assemblies. In those embodiments, all or part of the steps described above and shown in FIGS. 7A-7H may be repeated.

Figure 8:
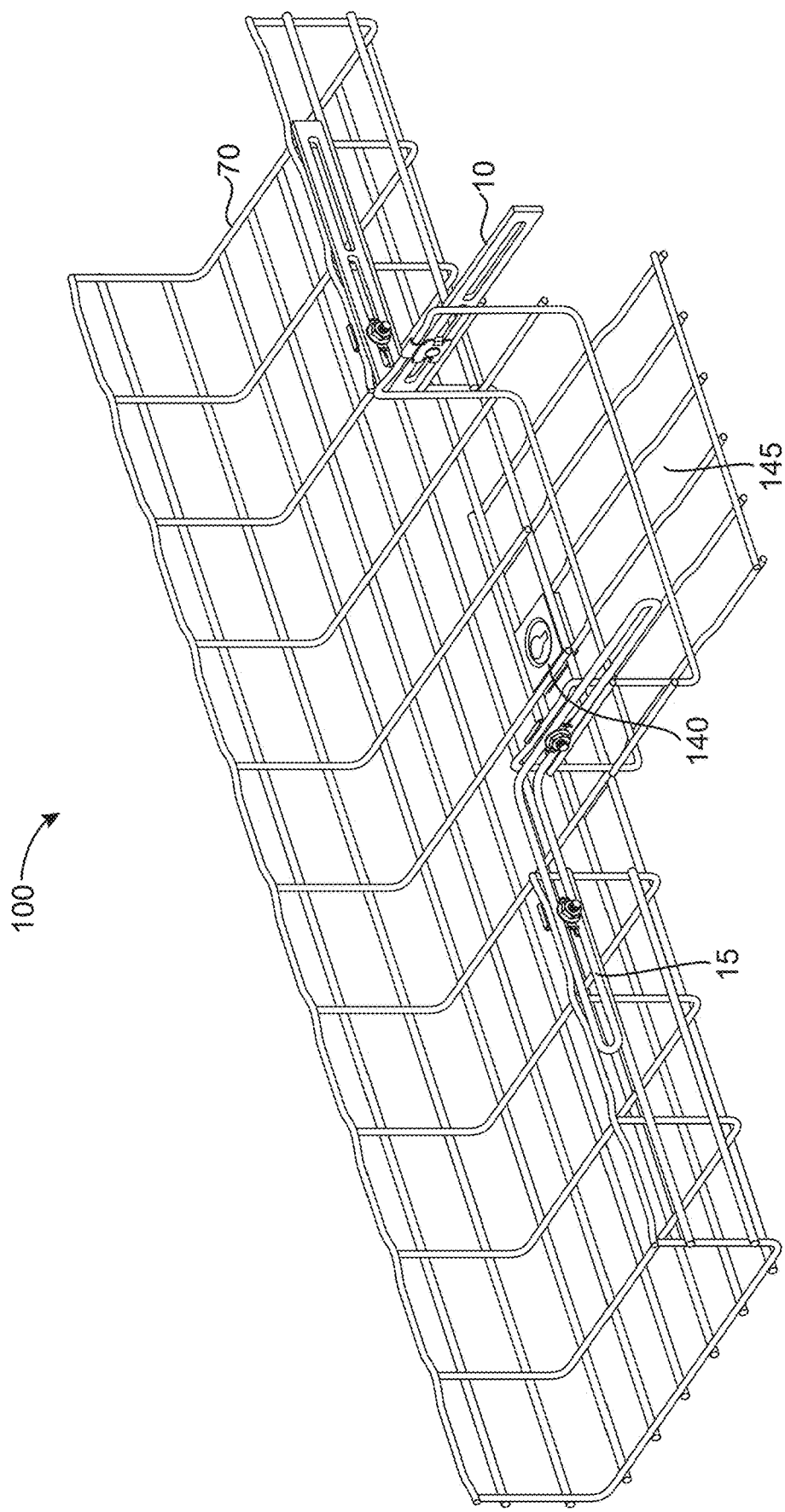
FIG. 8 is an isometric view of a slider bracket assembly according to one aspect of the disclosure.
Figure 9:
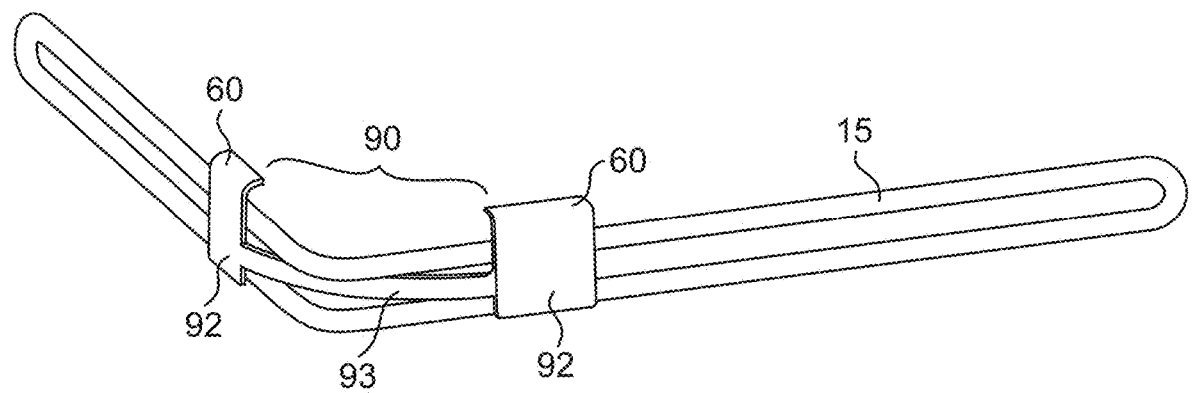
FIG. 9 is an isometric view of a wire-style bracket with a corner clip according to one aspect of the disclosure.

Optionally, with reference to FIG. 8, one or more washers 140 may be installed to further secure the tray portion assembly 145 to the main tray 70. In some embodiments, washers 140 are CE40 washers. In other embodiments, other fastening devices, similar to CE40 washers 140 may be used.

In some embodiments, slider bracket assembly 100 can comprise two strap-slider brackets 10, or two wire-style brackets 15, or both a wire-style bracket 15 and a strap-slider bracket 10, for example, in FIG. 8.

With reference to FIGS. 9, 10, 11a, 11b, 12, and 13 the strap-slider bracket 10 and or wire-style bracket 15 can have various additional configurations. For example, with reference to FIG. 9, wire-style bracket 15 can be configured with a corner clip 90 for coupling the wire-style bracket 15 to the tray section 150 and/or main cable tray 70. Instead of or in addition to using slider bracket 50, corner clip 90 can be used. Corner clip 90 comprises two bracket sections 92 joined together by a coupling wire 93. Each bracket section 92 has a top flange 60 that can hook onto a top section 65 of a tray section 150 or a top section 165 of a main cable tray 70. In some embodiments, bracket sections 92 are spot weld to the wire-style bracket 15, such that installation steps 7A and 7D may be eliminated. In different embodiments, coupling wire 93 can be different lengths to accommodate different sized slider brackets 15. For example, in embodiments with a longer coupling wire 93, the bracket sections 92 are spaced farther from each other. In some embodiments, corner clip 90 can be used in a similar manner on a strap-slider bracket 10.

In some embodiments, slider bracket 50 is welded to the strap-slider bracket 10 and/or wire-style bracket 15 in a predetermined position, such that during an installation, and with reference to the steps and figures outlined in FIGS. 7A-H, steps 7A and 7D may be eliminated.

Figure 10:
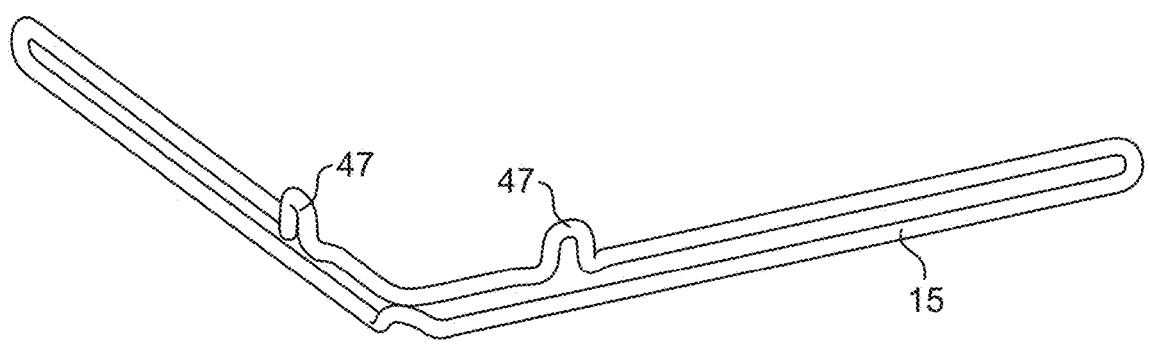
FIG. 10 is an isometric view of a wire-style bracket with loops according to one aspect of the disclosure.

With reference to an embodiment illustrated in FIG. 10, wire-style bracket 15 comprises two loops 47 that are used to couple the slider bracket 15 to tray section 150, and/or cable tray 70. In these such embodiments, loops 47 replace slider brackets 50, such that during installation, wire-style bracket 15 can be coupled to a first end 151 of the tray portion 150 by rotating the wire-style bracket 15 upwards from the first end 151 in approximately a 45 degree angle such that a first loop 47 mates with one of the top wires 65 on the first end 151 of the tray portion 150.

The wire-style bracket 15 is then rotated downwards such that the outer side portion 17 of the wire-style bracket 15 is flush with the rails 14 adjacent to the top mesh wire 65 and a rung 16 of tray portion 150.

A second wire-style bracket 15 can be coupled to a second end 152 of tray portion 150 in a manner similar to those described above regarding wire-style bracket 15 to form a tray portion assembly 145.

Next, in some embodiments, a main tray 70 can be cut such that the width W of opening 135 is slightly wider than the width W of the tray portion 150. In other embodiments, main tray 70 is pre-cut such the width W of opening 135 is slightly wider than the width W of the tray portion 150.

Tray portion assembly 145 is rotated upwards approximately 45 degrees such that the loops 47 on the wire-style bracket 15 couple to the top wire mesh sections 165 of cable tray 70. After the loops 47 have coupled to wire mesh sections 165, the tray portion assembly 145 is rotated downward such that the back sides 17 of wire-style bracket 15 are flush against the rails 14 adjacent to wire mesh sections 165 and adjacent top rungs 16 of the cable tray 70 to form the tray assembly 100.

Figure 11A:
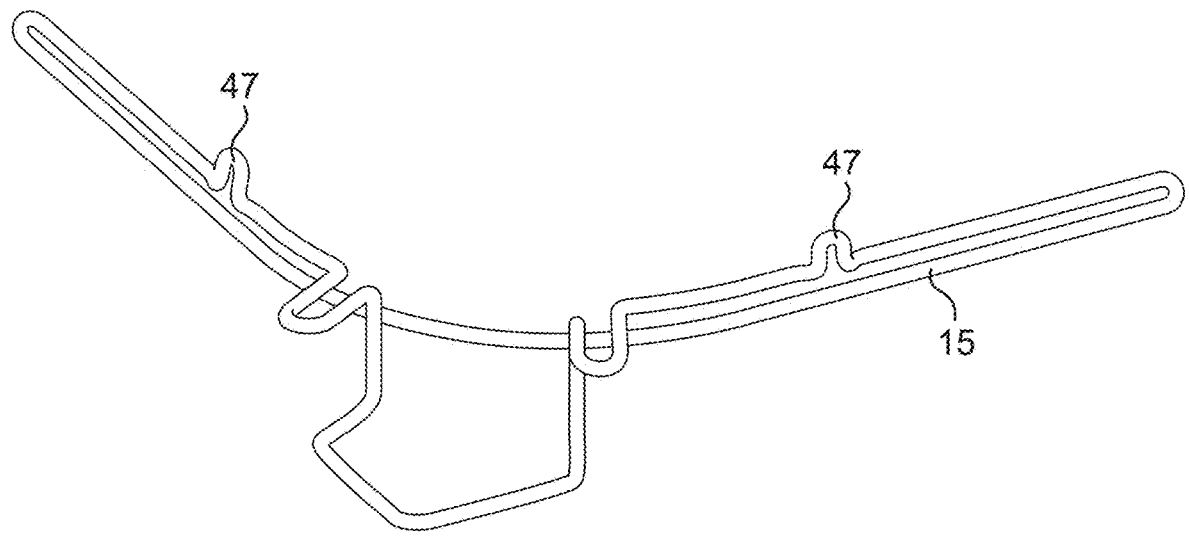
FIG. 11A is an isometric view of a wire-style bracket according to one aspect of the disclosure.
Figure 11B:
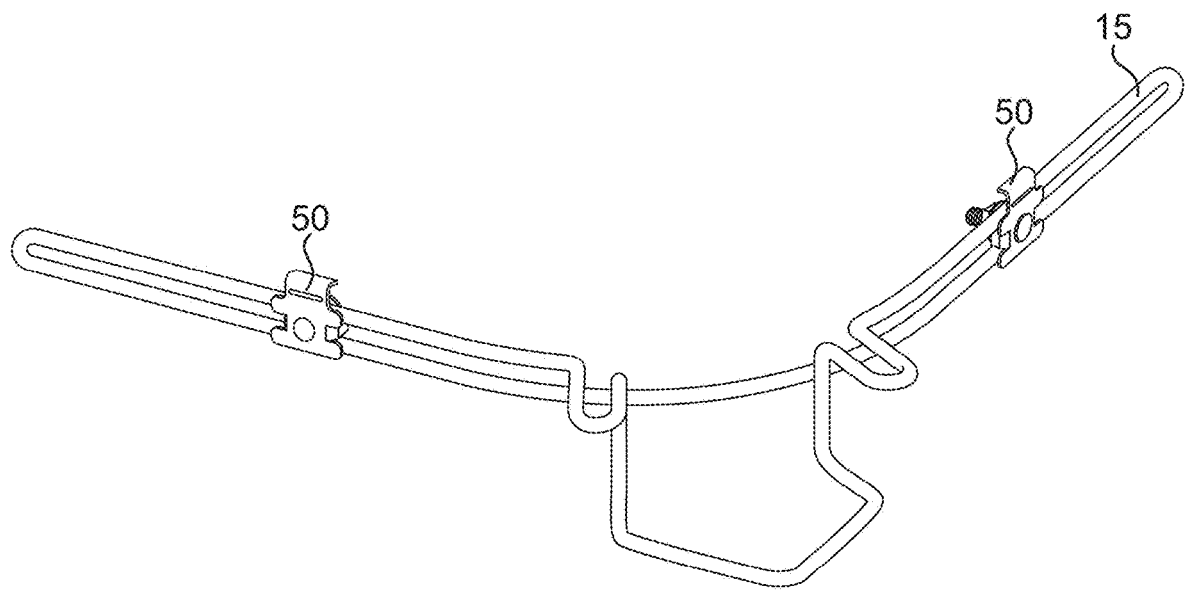
FIG. 11B is an isometric view of a wire-style bracket according to one aspect of the disclosure.

With reference to embodiments illustrated in FIGS. 11A and 11B, wire-style bracket 15 is configured with a radius bend having a greater than 90 degree bend (as opposed to those embodiments of the strap slider bracket 10, having approximately a 90 degree bend). The radius bend can be used for cable tray embodiments needing less stress on cables as they turn a corner. With reference to FIG. 11A, in some embodiments, the wire-style bracket 15 can be configured with loops 47 to couple to tray sections. In other embodiments, and with reference to FIG. 11B, the wire-style bracket 15 can be configured with slider brackets 50 for coupling to tray sections.

Figure 12:
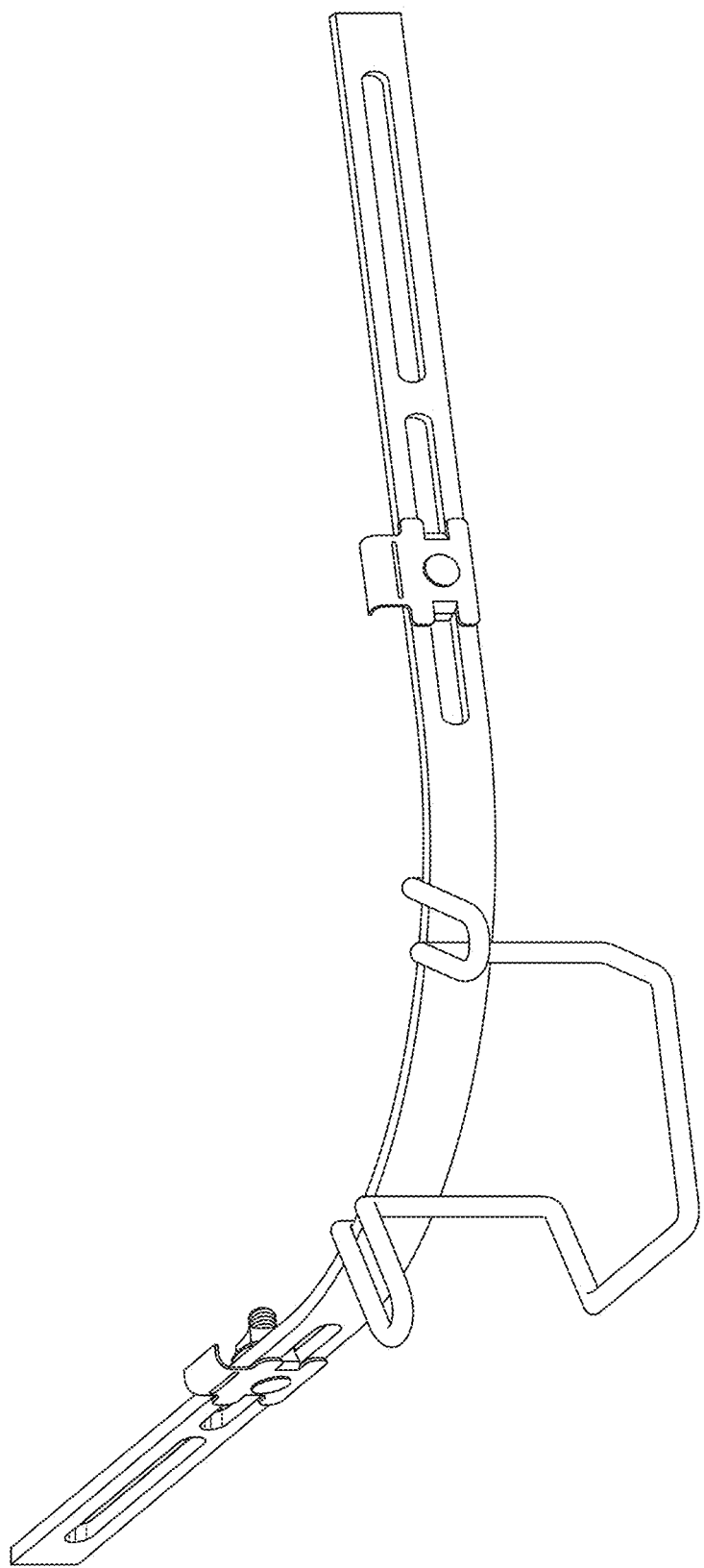
FIG. 12 is an isometric view of a strap slider bracket according to one aspect of the disclosure.

In other embodiments still, and with reference to FIG. 12, a radius bend bracket can be configured as a strap slider-bracket 10 that uses slider brackets 50 and/or loops 47 (not shown) for coupling to tray sections.

Figure 13:
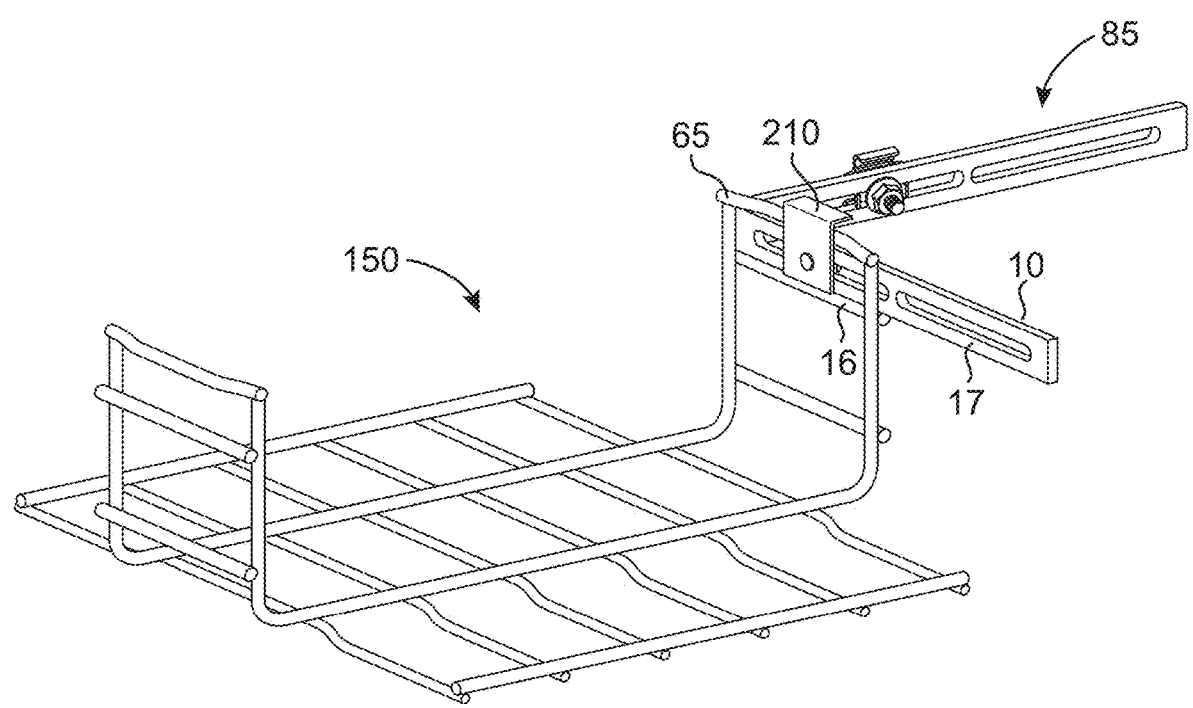
FIG. 13 is an isometric view of a clip keeper according to one aspect of the disclosure.

In other embodiments, and with reference to FIG. 13, installation can also include the use of a clip keeper 210 instead of a slider bracket 50. That is, when the bracket assembly 85 is rotated downwards, clip keeper 210 can be coupled to the top mesh wire 65 such that the outer side portion 17 of the strap-slider bracket 10 is flush with a rung 16 of main tray 150.

Thus, there has been shown and described a novel cable tray system including a flexible-wire, which overcomes many of the problems of the prior art. It will be apparent, however, to those familiar in the art, that many changes, variations, modifications, and other uses and applications for the subject devices and methods are possible. All such changes, variations, modifications, and other uses and applications that do not depart from the spirit and scope of the disclosure are deemed to be covered by the disclosure which is limited only by the claims which follow.

What is claimed is:

1. A method for installing a slider bracket assembly, comprising:
    coupling a first slider bracket to a first portion of a first strap-slider bracket;
    coupling a second slider bracket to a second portion of the first strap-slider bracket to form a first bracket assembly;
    coupling a third slider bracket to a first portion of a second strap-slider bracket;
    coupling a fourth slider bracket to a second portion of the second strap-slider bracket to form a second bracket assembly;
    rotating the first bracket assembly to couple a flange located on the first slider bracket to a first portion of a tray section;
    rotating the first bracket assembly, so that the first slider bracket is flush with an end portion of the first portion of the tray section, while the flange remains coupled to the first portion of the tray section;
    rotating the second bracket assembly to couple a flange located on the second slider bracket to a second portion of the tray section;
    rotating the second bracket assembly, so that the second slider bracket is substantially flush with an end portion of the second portion of the tray section,
    while the flange remains coupled to the second portion of the tray section to form a tray section assembly.

2. The method of claim 1, further comprising;
    aligning the tray section assembly with an opening in a main cable tray;
    rotating the tray section assembly to couple a flange on the second slider bracket to a first portion of a main cable tray and a flange on the fourth slider bracket to a second portion of a main cable tray;
    rotating the tray section assembly so that the second slider bracket is flush with a first side portion of the of the main cable tray, and the fourth slider bracket is flush with a second side portion of the main cable tray, while the flange on the second slider bracket and the flange on the fourth slider bracket both remain coupled to the main cable tray, such that a floor of the tray section assembly becomes substantially coplanar with a floor of the main cable tray.

3. The method of claim 2, further comprising coupling the floor of the tray section assembly to the floor of the main cable tray with a washer.

* * * * *